(12) United States Patent
Noguchi

(10) Patent No.: US 11,775,618 B2
(45) Date of Patent: Oct. 3, 2023

(54) IMAGE PROCESSING DEVICE, IMAGE PROCESSING METHOD, AND IMAGE PROCESSING PROGRAM FOR DECIDING A SIMILARITY BETWEEN A CAPTURED IMAGE AND A SAMPLE IMAGE

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 17/470,440

(22) Filed: Sep. 9, 2021

(65) Prior Publication Data

US 2021/0406588 A1  Dec. 30, 2021

Related U.S. Application Data

(63) Continuation of application No. PCT/JP2020/004148, filed on Feb. 4, 2020.

(30) Foreign Application Priority Data

Mar. 26, 2019  (JP) .................. 2019-058866

(51) Int. Cl.
*G06F 18/2413*  (2023.01)
*G06V 20/62*  (2022.01)
(Continued)

(52) U.S. Cl.
CPC ...... *G06F 18/2413* (2023.01); *G06F 18/2113* (2023.01); *G06F 18/22* (2023.01); *G06V 20/62* (2022.01)

(58) Field of Classification Search
USPC .................. 382/220; 707/748, 749, 17.001
See application file for complete search history.

(56) References Cited

U.S. PATENT DOCUMENTS 7,831,599 B2 * 11/2010 Das .................. G06F 16/58
382/225
8,861,804 B1 * 10/2014 Johnson ............. G06V 40/172
382/218
(Continued)

FOREIGN PATENT DOCUMENTS

JP   2005-184791 A   7/2005
JP   2007-221498 A   8/2007
(Continued)

OTHER PUBLICATIONS

International Search Report issued in PCT/JP2020/004148; dated Apr. 21, 2020.
(Continued)

*Primary Examiner* — Kathleen Y Dulaney
(74) *Attorney, Agent, or Firm* — Studebaker & Brackett PC

(57) ABSTRACT

Provided are an image processing device, an image processing method, and an image processing program that can decide a user image that is similar to a plurality of model images and that follows a flow of the plurality of model images. Combinations of (I2) and (P3), (I51) and (P21), (I150) and (P49), (I198) and (P79), (I201) and (P30), (I249) and (P99), (I300) and (P101), and (I301) and (P112) in which similarities between the model images and the user images are equal to or more than a first threshold value are detected. The combination of (I201) and (P30) in which a relative time difference of the imaging time is equal to or more than a second threshold value is eliminated, and the rest combinations are second combinations. From among the second combinations, a model image group and a user image group, which are a collection of similar images, are decided, and the user images similar to the model images attached on (Continued)

a model album are decided from the user image group. A user album is created from the decided user images.

11 Claims, 11 Drawing Sheets

(51) Int. Cl.
*G06F 18/22* (2023.01)
*G06F 18/2113* (2023.01)

(56) References Cited

U.S. PATENT DOCUMENTS

| | | | | |
|---|---|---|---|---|
| 8,949,253 | B1* | 2/2015 | Jing | G06F 16/51 |
| | | | | 707/723 |
| 2002/0122067 | A1* | 9/2002 | Geigel | H04N 1/00172 |
| | | | | 715/788 |
| 2004/0208365 | A1* | 10/2004 | Loui | G06V 10/758 |
| | | | | 382/224 |
| 2005/0185202 | A1* | 8/2005 | Tsue | H04N 1/00132 |
| | | | | 358/1.9 |
| 2006/0200475 | A1* | 9/2006 | Das | G06F 16/58 |
| 2018/0164964 | A1* | 6/2018 | Hori | G06T 11/60 |
| 2018/0167532 | A1* | 6/2018 | Obayashi | G11B 27/34 |

FOREIGN PATENT DOCUMENTS

| | | |
|---|---|---|
| JP | 2011-223250 A | 11/2011 |
| JP | 2012-120007 A | 6/2012 |
| JP | 2018-097484 A | 6/2018 |

OTHER PUBLICATIONS

International Preliminary Report on Patentability and Written Opinion issued in PCT/JP2020/004148; dated Sep. 28, 2021.

* cited by examiner

IMAGE PROCESSING DEVICE, IMAGE PROCESSING METHOD, AND IMAGE PROCESSING PROGRAM FOR DECIDING A SIMILARITY BETWEEN A CAPTURED IMAGE AND A SAMPLE IMAGE

BACKGROUND OF THE INVENTION

1. Field of the Invention

The present invention relates to an image processing device, an image processing method, and an image processing program.

2. Description of the Related Art

Even in a case in which a general camera user captures a picture of a wedding ceremony and tries to create an album of the wedding ceremony from the captured picture, the level of performance thereof does not reach the album created by an album specialist. For this reason, it is necessary to improve the level of performance in a case in which the general camera user creates an album such as a wedding ceremony.

In the field of image processing, it is conceivable that in a case of laying out a plurality of image groups, the image group can include an image including an object of a type desired by a user (JP2018-097484A), images of a specific person can be displayed in time series (JP2012-120007A), and support can be performed in which what kind of imaging is required to specify what the captured image is (JP2011-223250A).

SUMMARY OF THE INVENTION

In a case in which an album is created by referring to a model album created by a professional, it is necessary to select images to be used for the album from a number of images and consider about the layout of the images, and it is a complicated task. For this reason, in a case in which the images similar to the images used in a model album are automatically detected from among the images captured by a user, and the images captured by the user are automatically attached on the album at the same positions as the positions of the images attached on the model, the images are similar to each other, but the images may be attached at the positions that do not match a flow of the entire wedding ceremony. For example, in a case in which a model image of the entrance of the bride and groom and the image of the last greeting of the bride and groom of the wedding ceremony captured by the user happen to be similar, in some cases, the image of the last greeting of the bride and groom of the wedding ceremony is attached on the first page of the album.

In JP2018-097484A, the images are divided into a plurality of image groups based on time information, and there is no idea of a model image. In JP2012-120007A, the images of a specific person are displayed in time series, also there is no idea of a model image. In JP2011-223250A, a flow of images attached on the album is not considered.

The present invention is to make it possible to decide captured images that are similar to a plurality of sample images and follow a flow of the plurality of sample images.

An image processing device according to an aspect of the present invention comprises a first detection unit that detects, from among a plurality of sample images and a plurality of captured images each of which has a rank, first combinations of the sample images and the captured images of which a similarity is equal to or more than a first threshold value, a second detection unit that detects, from among the first combinations, second combinations of the sample images and the captured images in which a difference between the rank of the sample image among the plurality of sample images and the rank of the captured image among the plurality of captured images is within a second threshold value, a first decision unit that decides, based on the second combinations, a combination of a sample image group including the sample images and a captured image group including the captured images regarded as the same scene as the sample image group, and a second decision unit that decides, from the captured image group, the captured image of which the similarity with one sample image included in the sample image group is equal to or more than a third threshold value.

Also, the present invention provides an image processing method suitable for an image processing device. That is, an image processing method according to another aspect of the present invention comprises detecting, from among a plurality of sample images and a plurality of captured images each of which has a rank, first combinations of the sample images and the captured images of which a similarity is equal to or more than a first threshold value by a first detection unit, detecting, from among the first combinations, second combinations of the sample images and the captured images in which a difference between the rank of the sample image among the plurality of sample images and the rank of the captured image among the plurality of captured images is within a second threshold value by a second detection unit, deciding, based on the second combinations, a combination of a sample image group including the sample images and a captured image group including the captured images regarded as the same scene as the sample image group by a first decision unit, and deciding, from the captured image group, the captured image of which the similarity with one sample image included in the sample image group is equal to or more than a third threshold value by a second decision unit.

Also, the present invention provides a program that controls a computer of an image processing device and a recording medium that stores the program.

Further, an image processing device may comprise a processor, in which the processor detects, from among a plurality of sample images and a plurality of captured images each of which has a rank, first combinations of the sample images and the captured images of which a similarity is equal to or more than a first threshold value, detects, from among the first combinations, second combinations of the sample images and the captured images in which a difference between the rank of the sample image among the plurality of sample images and the rank of the captured image among the plurality of captured images is within a second threshold value, decides, based on the second combinations, a combination of a sample image group including the sample images and a captured image group including the captured images regarded as the same scene as the sample image group, and decides, from the captured image group, the captured image of which the similarity with one sample image included in the sample image group is equal to or more than a third threshold value.

It is preferable that the plurality of sample images and the plurality of captured images follow a series of flows that configure one event such as a wedding ceremony. In addition, it is preferable that the ranks of both the plurality of sample images and the plurality of captured images be decided to be continuous for the images of items in the event such as the entrance of the bride and groom and the greeting of the guest of honor. Therefore, it is preferable that the ranks of the images of the same scene are decided to be continuous.

The image processing device may further comprise a first grouping unit that divides, based on the second combinations, the plurality of sample images into a plurality of the sample image groups, and a second grouping unit that divides, based on the second combinations, the plurality of captured images into a plurality of the captured image groups.

The image processing device may further comprise a display device that displays the captured image decided by the second decision unit.

The one sample image is adopted in the sample photo book from among the plurality of sample images.

The image processing device may further comprise a positioning unit that positions the captured image decided by the second decision unit at a position at which the one sample image of which the similarity with the captured image is equal to or more than the third threshold value is positioned in a photo book template for generating a photo book corresponding to the sample photo book.

For example, the first detection unit detects, from among the plurality of sample images and the plurality of captured images, the first combinations of the sample images and the captured images of which the similarity is equal to or more than the first threshold value, as third combinations of the sample images and the captured images of which the similarity is maximum.

For example, the first decision unit decides two or more sample images and two or more captured images which are present between two second combinations having different ranks among the second combinations detected by the second detection unit as the sample image group and the captured image group.

The first decision unit decides two or more sample images and two or more captured images which are present between two second combinations having adjacent ranks among the second combinations detected by the second detection unit as the sample image group and the captured image group.

For example, the first decision unit may decide two or more sample images and two or more captured images which are present between the second combinations having ranks before and behind one second combination among the second combinations detected by the second detection unit as the sample image group and the captured image group.

For example, the second decision unit decides, from the captured image group decided by the first decision unit, the captured image of which the similarity is maximum with one sample image included in the sample image group decided by the first decision unit.

According to the present invention, it possible to decide the captured images that are similar to the plurality of sample images and follow a flow of the plurality of sample images.

DESCRIPTION OF THE PREFERRED EMBODIMENTS

First Embodiment

Figure 1:
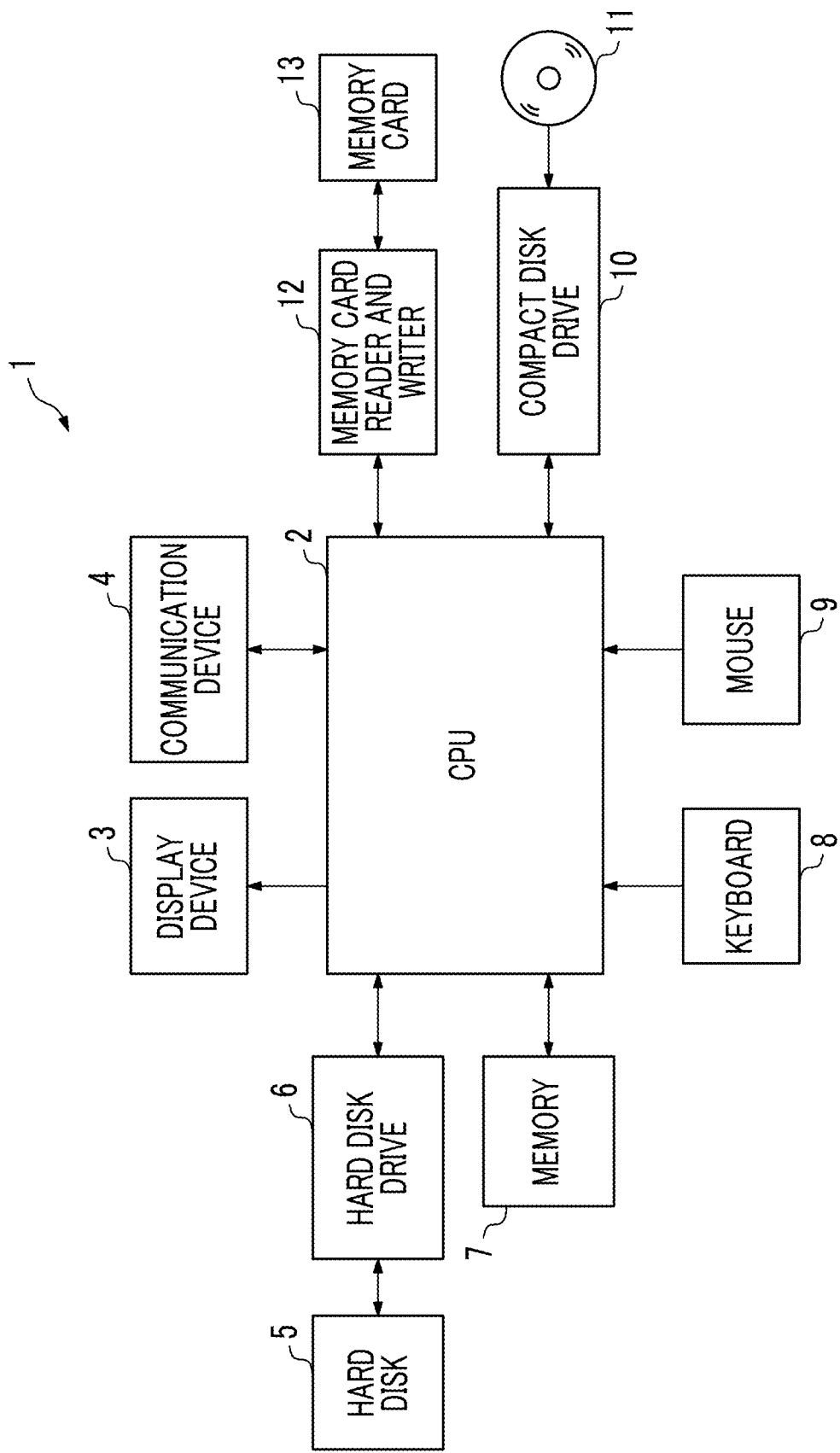
FIG. 1 is a block diagram showing an electric configuration of an image processing device.

FIG. 1 shows an embodiment of the present invention, and is a block diagram showing an electric configuration of an image processing device 1.

The entire operation of the image processing device 1 is controlled by a central processing unit (CPU) 2.

The image processing device 1 includes a display device 3 that displays an image and other information on a display screen, and a communication device 4 that is connected to the Internet and other networks and communicates with devices other than the image processing device 1. Also, the image processing device 1 includes a hard disk 5, a hard disk drive 6 that accesses to the hard disk 5, a memory 7 that stores data and the like, and a keyboard 8 and a mouse 9 that inputs commands and the like. Further, the image processing device 1 also includes a compact disk drive 10 that accesses to a compact disk 11 and a memory card reader and writer 12 that accesses to a memory card 13.

An operation program of the image processing device 1 which will be described below is received by the communication device 4 via the Internet. The received operation program is installed in the image processing device 1. The operation program may be recorded in a portable recording medium such as the compact disk 11 and read from the portable recording medium without being received by the image processing device 1 via the network such as the Internet and being installed in the image processing device 1. In this case, the operation program read from the portable recording medium is installed in the image processing device 1. The operation program is readable by the CPU 2 (computer) of the image processing device 1.

Figure 2:
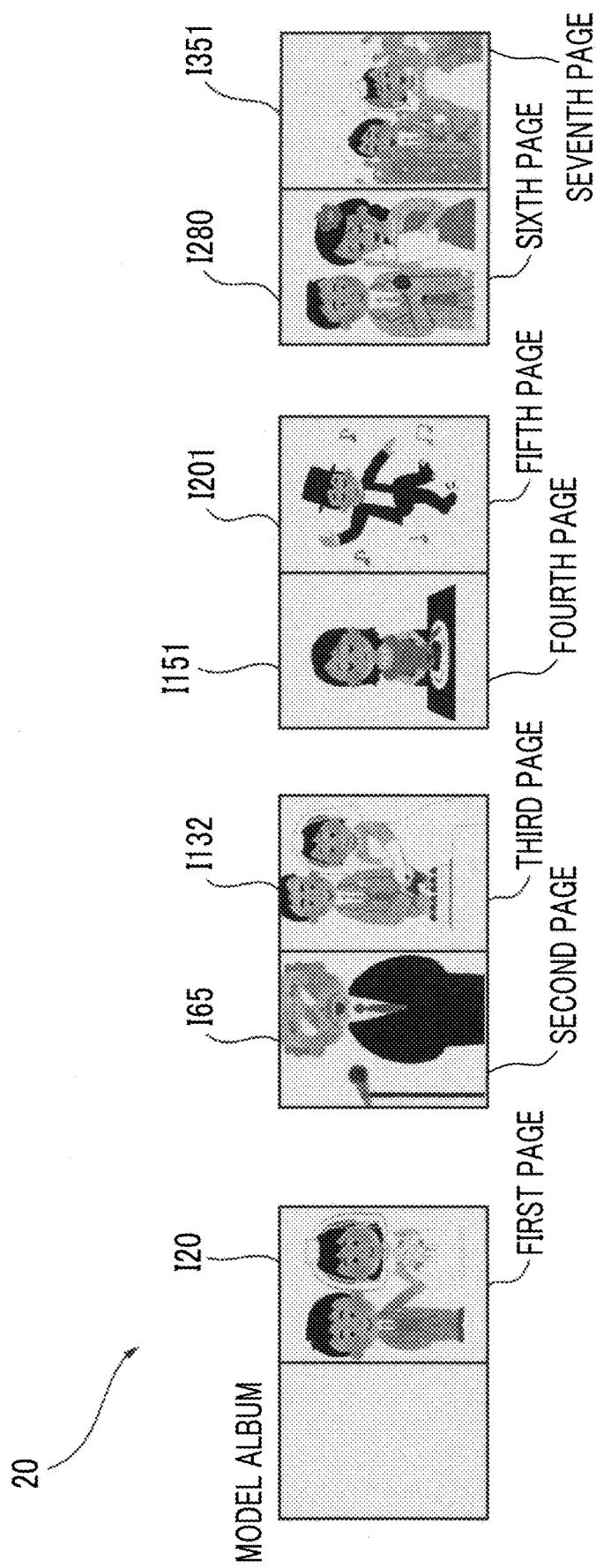
FIG. 2 shows an example of a model album.

FIG. 2 is an example of a model album (an example of a sample photo book).

A model album 20 shown in FIG. 2 is an album of a wedding ceremony (it is not limited to the album of a wedding ceremony). The model album 20 is created by a professional photographer (it may not be a professional photographer), and is an album that a nonprofessional can use as a model such as the compositional arrangement of the model image and the selection criteria of the image. From among a number of images captured at a user's wedding ceremony (referred to as a user image, which is an example of a captured image), the images having the same compositional arrangement and scene as the model image attached on a model album 20 are detected by the image processing device 1, and the detected user images are attached on the album in the same ranks as the ranks of model images I20, I65, I132, I151, I201, I280, and I351 which are attached on the model album 20, so that a user album similar to the model album 20 is created. A plurality of the model albums 20 may be present, the user may select a desired model album 20 from among the plurality of model albums 20, and the user album similar to the selected model album 20 may be created.

The model album 20 shown in FIG. 2 is configured by first to seventh pages, but may be a model album having 8 pages or more, or may be a model album 20 having less than 7 pages. The model album 20 is an album of the wedding ceremony that proceeds in the order of each item of "entrance of bride and groom", "greeting of guest of honor", "wedding cake cutting", "talk and meal", "entertainment", "acknowledgment of thanks to parents", and "greeting of bride and groom". On the first page, second page, third page, fourth page, fifth page, sixth page, and seventh page of the model album 20, the model image I20 of "entrance of bride and groom", the model image I65 of "greeting of guest of honor", the model image I132 of "wedding cake cutting", the model image I151 of "talk and meal", the model image I201 of "entertainment", the image I280 of "acknowledgment of thanks to parents", and the image I351 of "greeting of bride and groom" are attached, respectively (the model images I20, I65, I132, I151, I201, I280, and I351 are examples of the sample image). In the model album 20 shown in FIG. 2, one image is attached on one page, but a plurality of images may be attached on one page. Further, in the model album 20, the scene of the image is changed for each page, but the image of the same scene may be attached on a plurality of pages.

Figure 3:
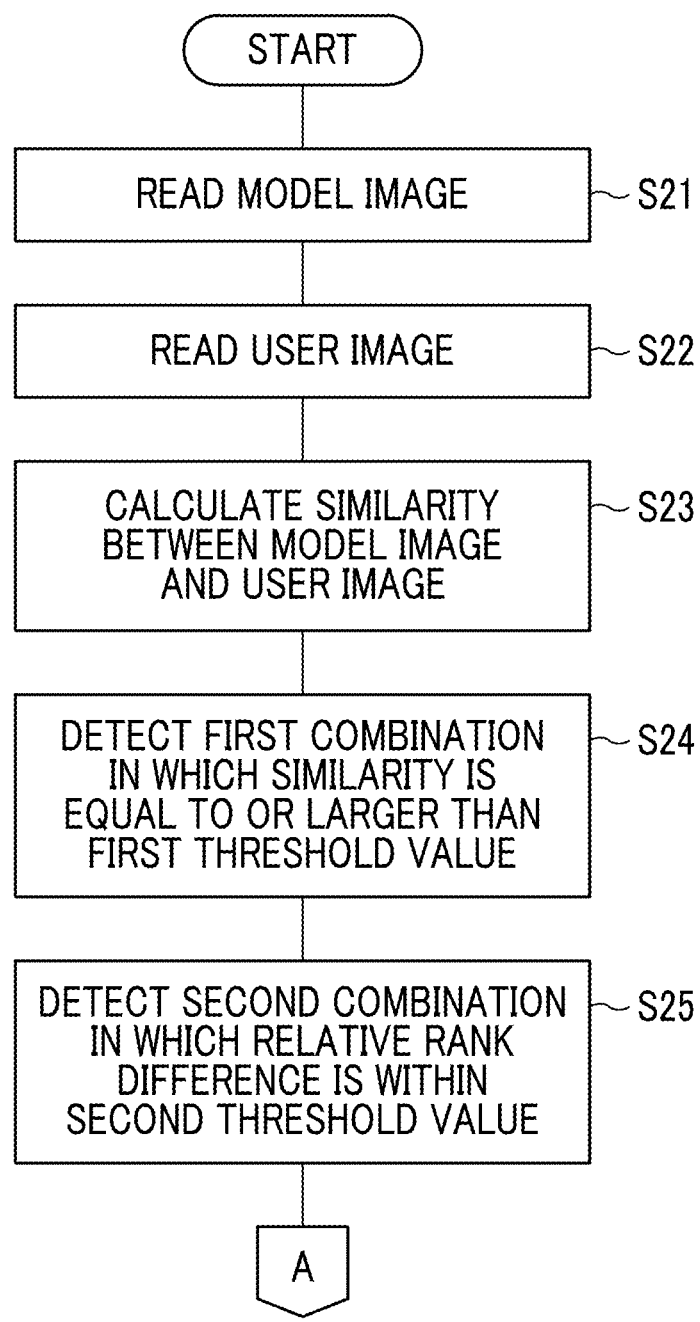
FIG. 3 is a flowchart showing a processing procedure of the image processing device.
Figure 4:
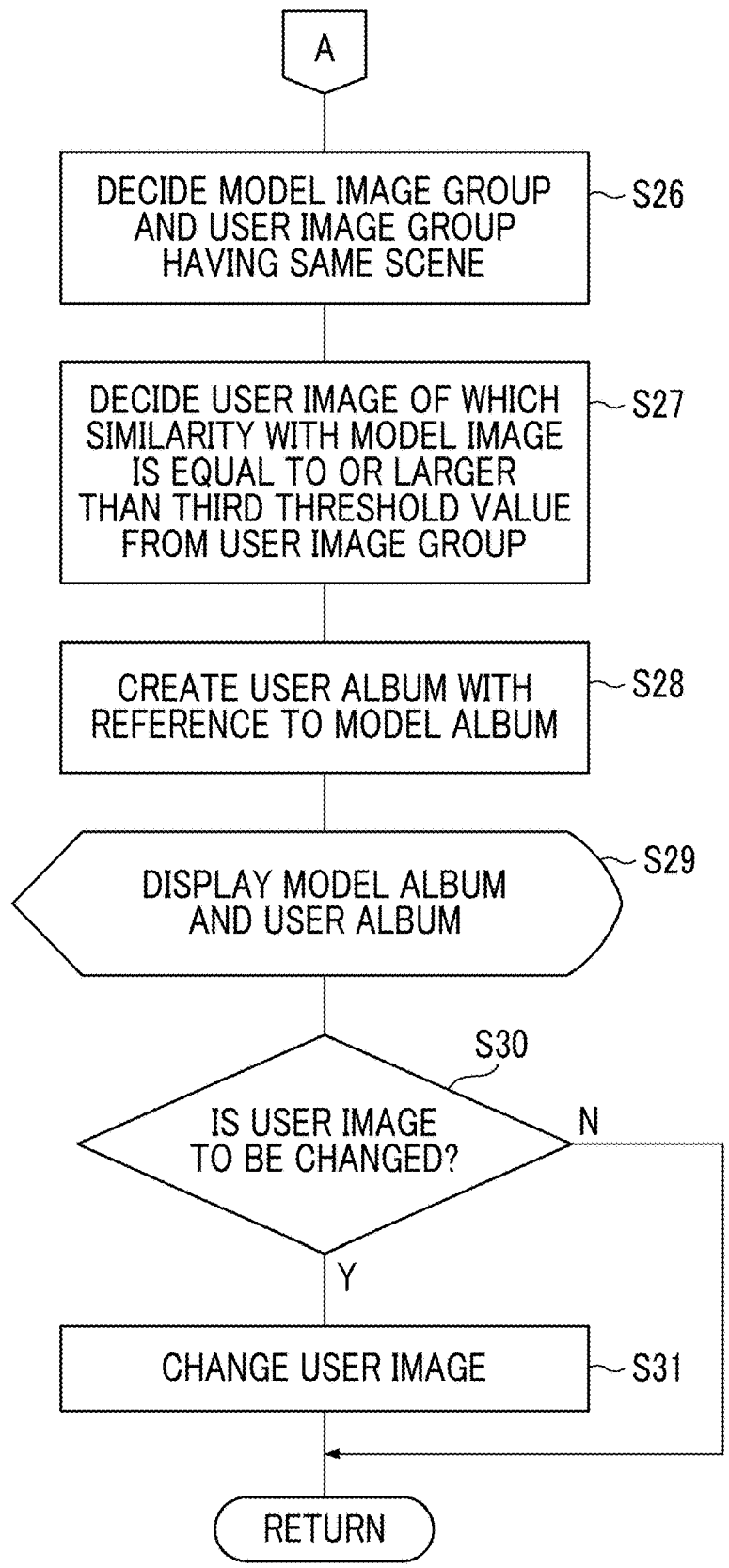
FIG. 4 is a flowchart showing the processing procedure of the image processing device.

FIGS. 3 and 4 are flowcharts showing processing procedures of the image processing device 1.

Image data representing a plurality of the model images is recorded on the compact disk 11 (image data representing the model images may be recorded on a recording medium other than the compact disk 11 or may be received via the network), and the image data representing the model images is read from the compact disk 11 (step S21). Further, image data representing a plurality of the user images is recorded on the memory card 13 (image data representing the user images may be recorded on a recording medium other than the memory card 13 or may be received via the network), and the image data representing the user images is read from the memory card 13 (step S22).

Figure 5:
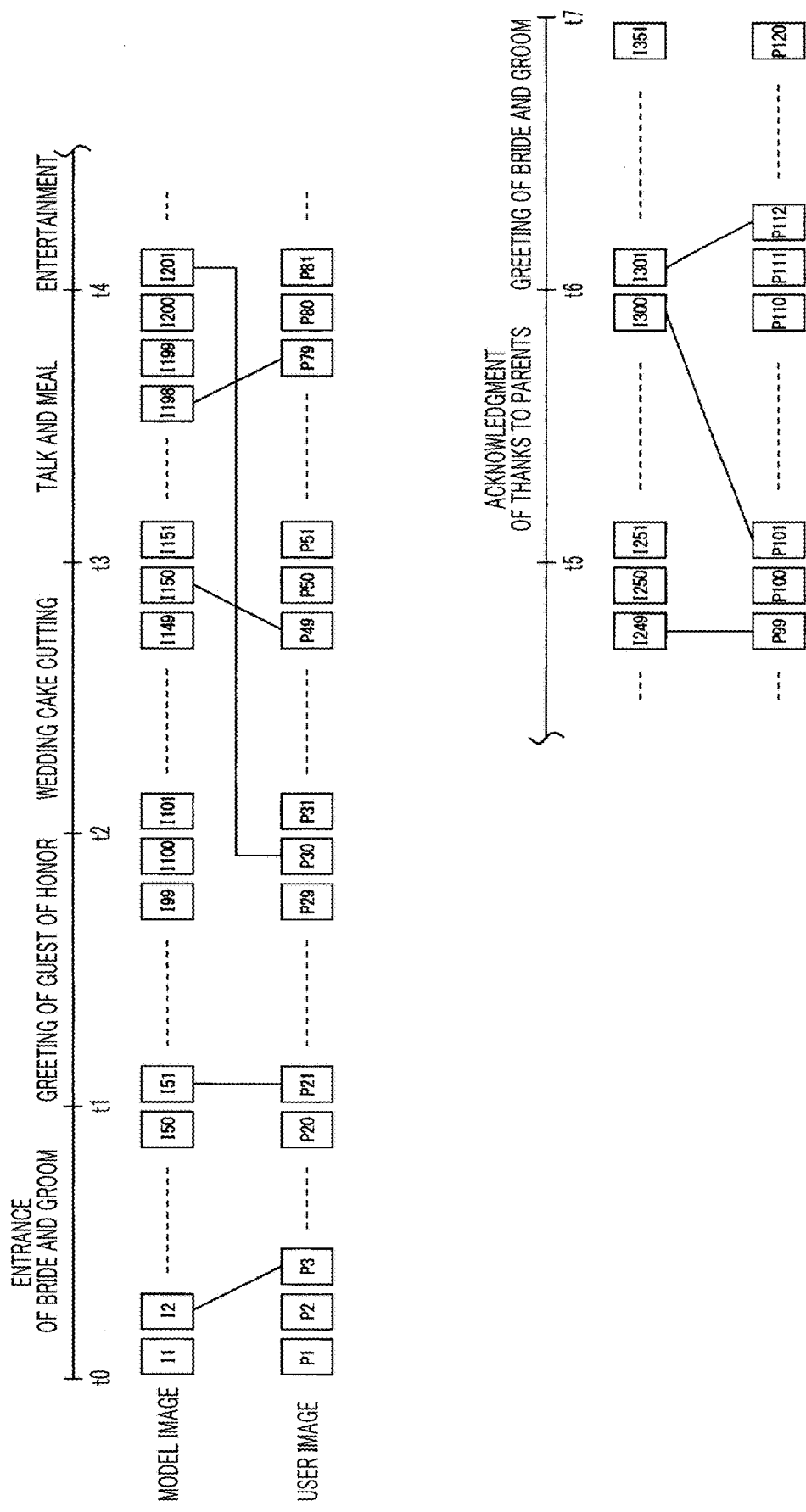
FIG. 5 shows examples of a model image and a user image.

FIG. 5 shows examples of the plurality of model images and examples of the plurality of user images.

There are 351 the plurality of model images of model images I1 to I351 (there may be 352 or more model images or may be less than 351 model images), and there are the plurality of 120 user images of user images P1 to P120 (there may be 121 or more user images or may be less than 120 user images). The image data representing these model images I1 to I351 is read from the compact disk 11, and the image data representing these user images P1 to P120 is read from the memory card 13.

The model images I1 to I50 are images of the scene of "entrance of bride and groom", and the model image I20 is selected from among these model images I1 to I50 and attached on the model album 20. The model images I51 to I100 are images of the scene of the "greeting of guest of honor", and the model image I65 is selected from among these model images I51 to I100 and attached on the model album 20. The model images I101 to I150 are images of the scene of the "wedding cake cutting", and the model image I132 is selected from among these model images I101 to I150 and attached on the model album 20. The model images I151 to I200 are images of the scene of "talk and meal", and the model image I151 is selected from among these model images I151 to I200 and attached on the model album 20. The model images I201 to I250 are images of the scene of "entertainment", and the model image I201 is selected from among these model images I201 to I250 and attached on the model album 20. The model images I251 to I300 are images of the scene of "acknowledgment of thanks to parents", and the model image I280 is selected from among these model images I251 to I300 and attached on the model album 20. The model images I301 to I351 are images of the scene of "greeting of bride and groom", and the model images I351 are selected from among these model images I301 to I351 and attached on the model album 20.

For example, the fact that the model images I1 to I50 are the same scene as the scene of "entrance of bride and groom" can be determined from the text "entrance of bride and groom" recorded in the header of each image file of the model images I1 to I50 (recording of the text is performed by a creator in a case of creating the album from among the model images). That is, the image processing device 1 recognizes that the model images I1 to I50 represent the same scene from the recording in the header of the image file. However, in this embodiment, the device does not necessarily have to understand like a human being that a target scene is the scene of the entrance of the bride and groom. The scenes need only be distinguished by different texts.

For example, in another embodiment, "1" is recorded in a predetermined region of the header of each image file of the model images I1 to I50, and another text such as "2" is recorded in a predetermined region of the header of the image files of the model images I51 and subsequent model images. As a result, it can be recognized that the model images I1 to I50 are the same scene, while the model images I51 and subsequent images are different scenes. The text "entrance of bride and groom" does not have to be associated with the scene, the scenes need only be distinguished.

In the following, for convenience of explanation of the present invention, it is assumed that the text "entrance of bride and groom" is recorded in the header of the model images I1 to I50 to distinguish the images from other scenes. It is not limited to the scene of the "entrance of "bride and groom", and the same applies to other scenes.

The ranks of the model images I1 to I351 are decided in the order of I1 to I351 (in this embodiment, the model images I1 to I351 are images of an event such as a wedding ceremony, the order of the images is decided for each item such as "entrance of bride and groom", "greeting of guest of honor", and the like held at the event, the rank means the continuous order of images in the same scene, and the order of each item is also decided for each event). For example, the order of the images I1 to I50 of the scene of the "entrance of bride and groom" is continuous from relative time t0 to t1, the order of the images I51 to I100 of the scene of the "greeting of guest of honor" is continuous from relative time t1 to t2, the order of the images I101 to I150 of the scene of the "wedding cake cutting" is continuous from relative time t2 to t3, the order of the images I151 to I200 of the scene of the "talk and meal" is continuous from relative time t3 to t4, the order of the images I201 to I250 of the scene of the "entertainment" is continuous from relative time t4 to t5, the order of the images I251 to I300 of the scene of the "acknowledgment of thanks to parents" is continuous from relative time t5 to t6, and the order of the images I301 to I351 of the scene of the "greeting of bride and groom" is continuous from relative time t6 to t7. In a case in which the model images I1 to I351 are continuously captured for each item in the order of the items of the event, the rank may be decided in accordance with the imaging time, or the imaging time itself may be decided as the rank. The ranks of the user images P1 to P120 are also decided in the imaging order in the event. In a case in which the user images are continuously captured for each item in the order of the items of the event, the rank may be decided in accordance with the imaging time, or the imaging time itself may be decided as the rank.

Returning to FIG. 3, the similarity of the images is calculated for a combination of each of the model images I1 to I351 and each of the user images P1 to P120 (step S23). After that, a first combination of the model image and the user image having the calculated similarity equal to or more than a first threshold value is detected by the CPU 2 (first detection unit) (step S24). From among each of the model images I1 to I351 and each of the user images P1 to P120, the first combinations of the model images and the user images of which the similarity is equal to or more than the first threshold value may be detected as a third combination of the sample images and the captured images of which the similarity is maximum.

The first threshold value is adjusted to the extent that the combination of the model image and the user image is a predetermined number (for example, the number of the model images attached on the model album 20 or a little more than the items performed in the event). In a case in which the number of the first combinations detected is large, the detection of the first combination may be repeated while the first threshold value is adjusted by the CPU 2 to the extent that the number is a predetermined number. Further, the number of the first combinations may be adjusted to the extent of a predetermined number such that the relative time intervals of the first combinations are separated by a certain amount or more. The first combination of the model image and the user image in which the relative time is close to the model image attached on the model album 20 may be detected, and in a case in which the plurality of model images are attached on the double-page spread or one page of model album 20, the first combination including the user images captured at the time corresponding to the relative time of the plurality of images attached on the double-page spread or the page on one page may be detected.

As shown in FIG. 5, for example, 8 combinations of a combination of the model image I2 and the user image P3, a combination of the model image I51 and the user image P21, a combination of the model image I150 and the user image P49, a combination of the model image I198 and the user image P79, a combination of the model image I201 and the user image P30, a combination of the model image I249 and the user image P99, a combination of the model image I300 and the user image P101, and a combination of the model image I301 and the user image P112 are detected as the first combination. Each of the model images included in the detected first combinations may or may not be included in a model image group attached on the model album 20.

Figure 6:
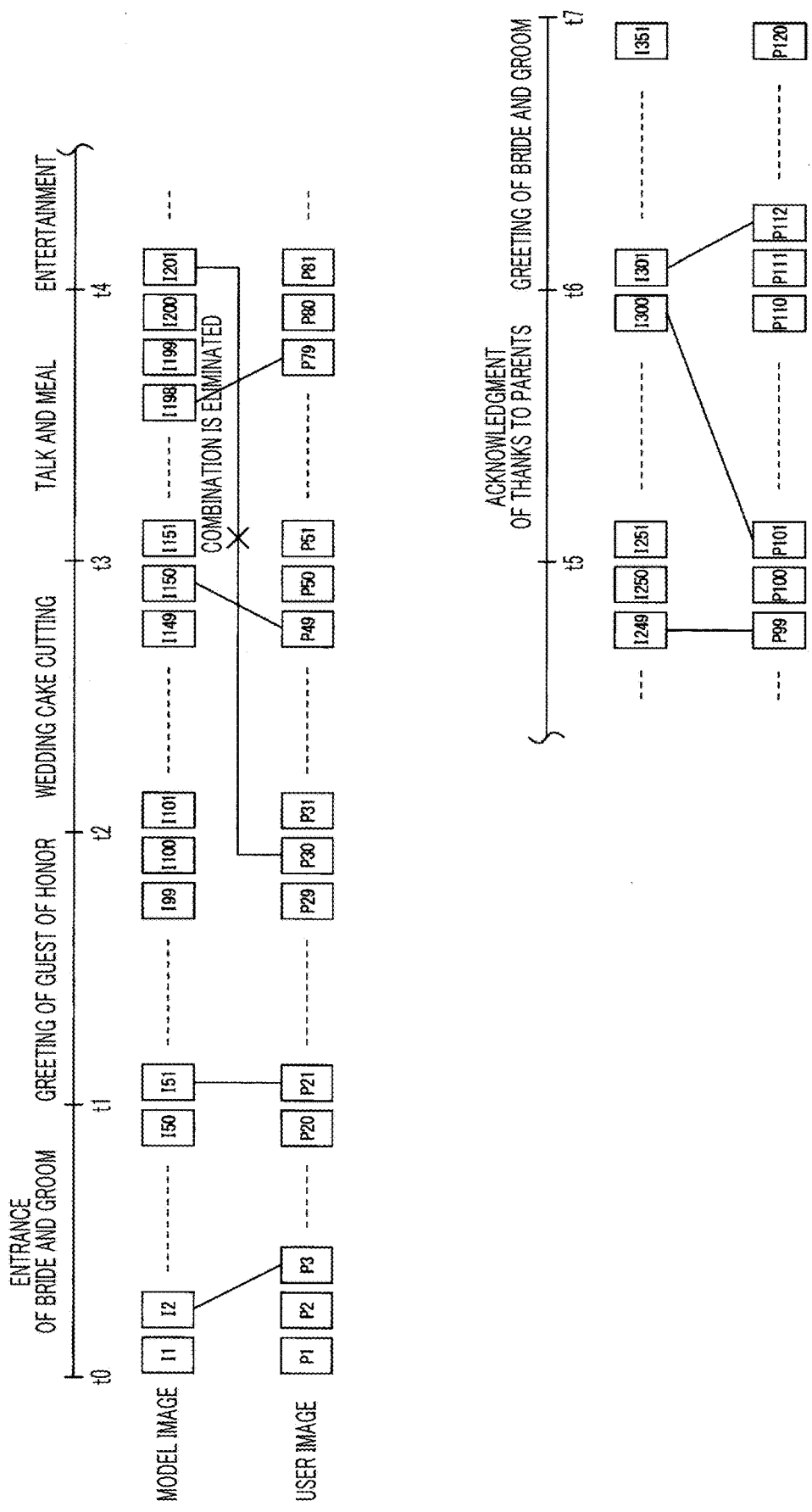
FIG. 6 shows examples of the model image and the user image.

Subsequently, the CPU (second detection unit) 2 detects a second combination in which a relative rank difference is within a second threshold value from among the detected first combinations (step S25). For example, the rank of the model images I1 to I351 and the rank of the user images P1 to P120 are standardized respectively (the standardization in this case means that among the model images I1 to I351 and the user images P1 to P120, the first image I1 of the model image and the first image P1 of the user image are set to 0, the last image I351 of the model image and the last image P120 of the user image are set to 1, and the scale is standardized such that the ranks of the images can be compared even in a case in which the number of images is different), and the second combination in which the difference between the model image and the user image in the ranks of the standardized model images I1 to I351 and the ranks of the user images P1 to P120 in the detected first combination is within the second threshold value need only be detected. For example, among the first combinations of the combination of the model image I2 and the user image P3, the combination of the model image I51 and the user image P21, the combination of the model image I150 and the user image P49, the combination of the model image I198 and the user image P79, the combination of the model image I201 and the user image P30, the combination of the model image I249 and the user image P99, the combination of the model image I300 and the user image P101, and the combination of the model image I301 and the user image P112, the rank difference between the model image and the user image is within the second threshold value in the first combinations of the combination of the model image I2 and the user image P3, the combination of the model image I51 and the user image P21, the combination of the model image I150 and the user image P49, the combination of the model image I198 and the user image P79, the combination of the model image I249 and the user image P99, the combination of the model image I300 and the user image P101, and the combination of the model image I301 and the user image P112, and thus these first combinations are detected as the second combination. On the other hand, in the first combination of the model image I201 and the user image P30, the rank difference between the model image and the user image does not fall within the second threshold value, so that this first combination cannot be the second combination, and as shown in FIG. 6, the combination is eliminated. In a case in which the first combination is eliminated, a new first combination may be searched for.

Next, based on the detected second combination, the plurality of model images are divided into the model image groups by the CPU 2 (first grouping unit). In the same manner, based on the detected second combination, the plurality of user images similar to the model image included in the model image group are divided into the user image groups by the CPU 2 (second grouping unit). Then, a combination of the model image group (an example of the sample image group) and the user image group (an example of the captured image group) including the user images that is considered to be the same scene as the scene of the model images included in the model image group is decided by the CPU 2 (first decision unit) (step S26 in FIG. 4).

For example, the combination of the groups is decided by defining the model images I2 to I50 as the first model image group of the same scene (I2 and I51 are extracted as the model image having the highest rank used in the combination of the model image I2 and the user image P3, which is the first combination, and the combination of the model image I51 and the user image P21, which is the next combination, the model image I2 to the model image I50 immediately before the model image I51 are decided as the first model image group of the same scene, and the same applies to other model image groups). Further, the combination of the groups is decided by defining the user images P3 to P20 as a first user image group that is considered as the same scene as the scene of the user images (P3 and P21 are extracted as the user image having the highest rank used in the combination of the model image I2 and the user image P3, which is the first combination, and the combination of the model image I51 and the user image P21, which is the next combination, the user image P3 to the user image P20 immediately before the user image P21 are decided as a first user image group of the same scene, and the same applies to other user image groups). In the same manner, the group combination is decided by defining the model images I51 to I149 as a second model image group of the same scene and defining the user images P21 to P48 as a second user image group, the group combination is decided by defining the model images I150 to I197 as a third model image group and defining the user images P49 to P78 as a third user image group, the group combination is decided by defining the model images I198 to I248 as a fourth model image group and defining the user images P79 to P98 as a fourth user image group, the group combination is decided by defining the model images I249 to I299 as a fifth model image group and defining the user images P99 to P100 as a fifth user image group, the group combination is decided by defining the model image I300 as a sixth model image group and defining the user images P101 to P111 as a sixth user image group, and the group combination is decided by defining the model images I301 to I351 as a seventh model image group and defining the user images P112 to P200 as a seventh user image group. In a case in which the number of images included in the group is less than a predetermined threshold value, the detection of the first combination and the detection of the second combination described above may be performed again to decide the group combination such that the number of images is equal to or more than the threshold value.

Next, from among the user image groups that configures the combinations with the model image groups including the model images I20, I65, I132, I151, I201, I280, and I351, the user images having the similarities with the model images I20, I65, I132, I151, I201, I280, and I351 (examples of one sample image) attached on the model album 20 are equal to or more than the third threshold value (may be the user image of which the similarity is maximum) are decided by the CPU 2 (second decision unit) (step S27).

Figure 7:
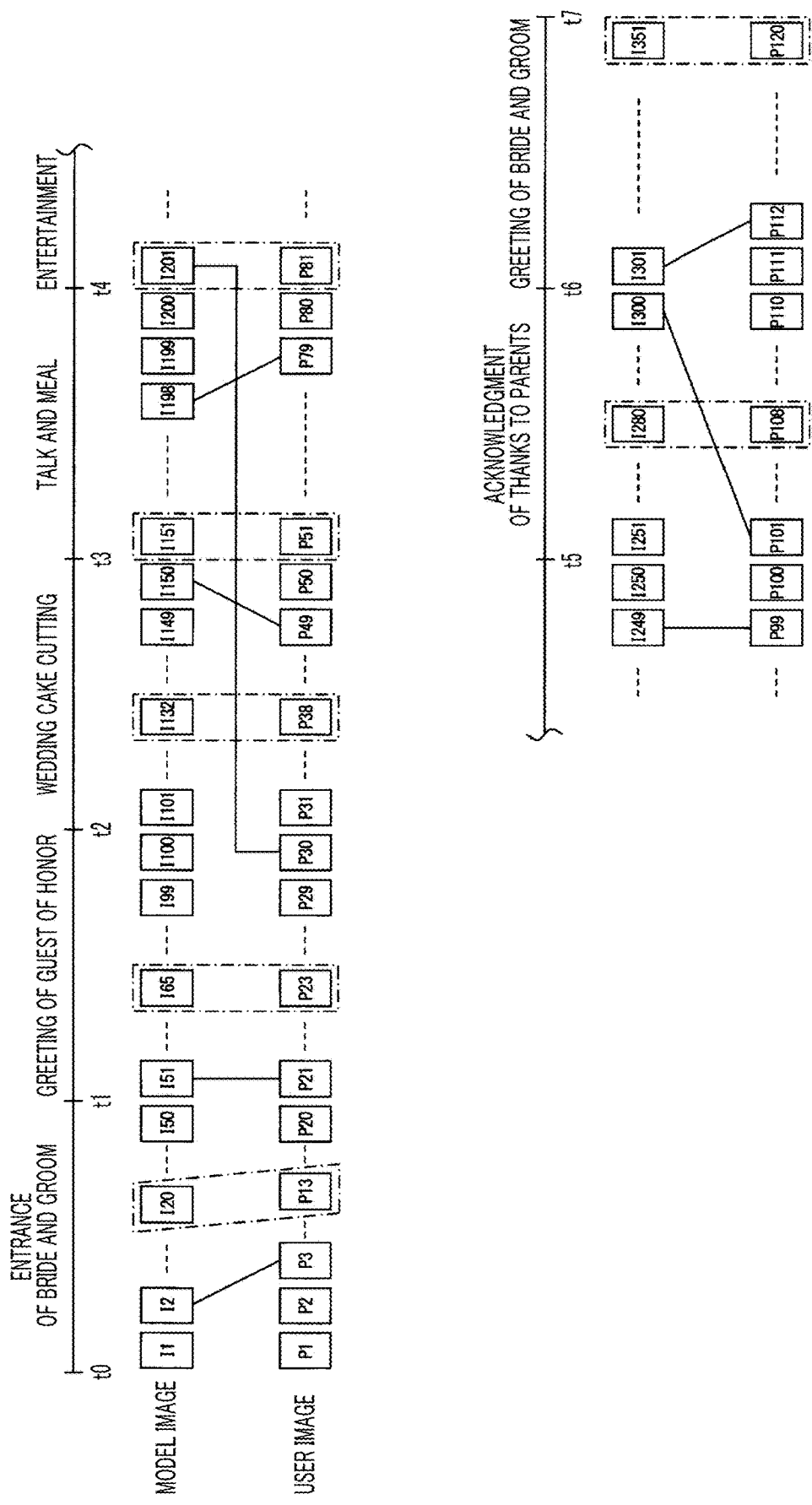
FIG. 7 shows examples of the model image and the user image.

As shown in FIG. 7, for example, the user images P13, P23, P38, P51, P81, P108, and P120 are decided from the model images I20, I65, I132, I151, I201, I280, and I351, respectively. In the case of the group combination of the fifth model image group of the model images I249 to I299 and the fifth user image group of the user images P99 to P100, the images included in the fifth user image group are only two of the image P99 and the image P100. Even in a case in which a user image similar to the model image I280 is to be detected from among these images P99 and P100, it may not be detected from among only the two images. In such a case, a user image close to the user images P99 and P100 included in the fifth user image group is also included in the fifth user image group. For example, 22 images including P89 to P98 (10 images captured immediately before P99) and P101 to P110 (10 images captured immediately after P100) are defined as the fifth user image group. From the fifth user image group, the user image P108 similar to the model image I280 attached on the model album 20 is decided.

By using the user images P13, P23, P38, P51, P81, P108, and P120 decided in this way, the user album is created by the CPU 2 (user album creating unit) with reference to the model album 20 (step S28). Since the user image P13 is similar to the model image I20, the user image P13 is positioned by the CPU 2 (positioning unit) and attached on the first page of the user album (an example of a photo book template), which is the same position as the position at which the model image I20 (an example of one sample image) is attached. Similarly, since the user image P23 is similar to the model image I65, the user image P23 is attached on the second page of the model album 20, since the user image P38 is similar to the model image I132, the user image P38 is attached on the third page of the model album 20, since the user image P51 is similar to the model image I151, the user image P51 is attached on the fourth page of the model album 20, since the user image P81 is similar to the model image I201, the user image P81 is attached on the fifth page of the model album 20, since the user image P108 is similar to the model image I280, the user image P108 is attached on the sixth page of the model album 20, and since the user image P120 is similar to the model image I351, the user image P120 is attached on the seventh page of the model album 20.

The created user album and model album are displayed on the display screen of the display device 3 (step S29).

Figure 8:
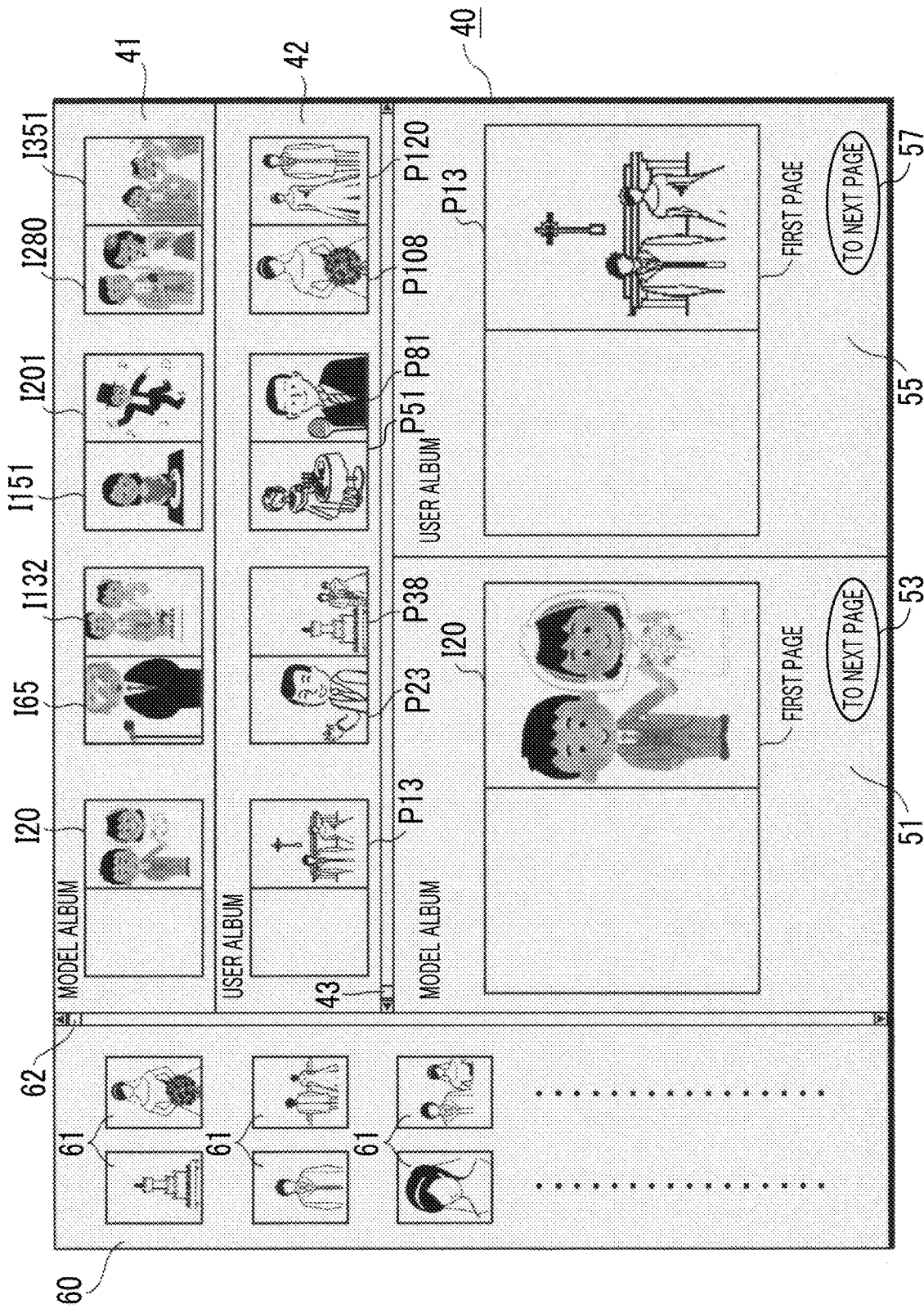
FIG. 8 shows an example of an album display window.

FIG. 8 shows an example of an album display window 40, which is displayed on the display screen of the display device 3.

The album display window 40 includes a model album list display region 41, a user album list display region 42, a model album page display region 51, a user album page display region 55, and a user image display region 60.

In the model album list display region 41, all the pages of the model album 20 are displayed, and the model images I20, I65, I132, I151, I201, I280, and I351 attached on the model album 20 are displayed. In the user album list display region 42, all the pages of the user album are displayed, and the user images P13, P23, P38, P51, P81, P108, and P120 attached on the user album are displayed. As described above, the user images P13, P23, P38, P51, P81, P108, and P120 attached on the user album are similar to the model images I20, I65, I132, I151, I201, I280, and I351, respectively, which are attached on the model album 20, and are the same scene images. The user images P13, P23, P38, P51, P81, P108, and P120 are attached on the pages of the user album, respectively, which correspond to the pages of the model album 20 on which the model images I20, I65, I132, I151, I201, I280, and I351 are attached.

A scroll button 43 is formed at a lower portion of the user album list display region 42. By scrolling the scroll button 43 to right and left, in a case in which there are the model image and the user image that are not displayed in the model album list display region 41 and the user album list display region 42, the model image and user image are displayed in the model album list display region 41 and the user album list display region 42. By scrolling the scroll button 43 to right and left, each page of the model album 20 displayed in the model album list display region 41 and each page of the user album displayed in the user album list display region 42 are moved to right and left in conjunction, but the pages may not be moved in conjunction.

In the model album page display region 51 shown in FIG. 8, the model image I20 attached on the first page of the model album 20 is displayed. At the lower right portion of the model album page display region 51, a next page button 53 in which the character string "to next page" is displayed is formed. In a case in which the next page button 53 is clicked, the next page of the model album 20 is displayed in the model album page display region 51.

The user image attached on the user album page is displayed in the user album page display region 55. In the example shown in FIG. 8, the user image P13 displayed on the first page of the user album is displayed in the user album page display region 55. The next page button 57 is also formed at the lower right portion of the user album page display region 55. In a case in which the next page button 57 is clicked, the next page of the user album is displayed in the user album page display region 55.

Only one of the next page button 53 or the next page button 57 may be formed, and in response to any click, the next pages of the pages displayed in the model album page display region 51 and the user album page display region 55 may be displayed in conjunction in the model album page display region 51 and the user album page display region 55. The user can compare and confirm the corresponding pages of the model album 20 and the user album.

A user image 61 (user images P1 to P120) is displayed in the user image display region 60. A scroll button 62 that can be moved up and down is formed on the right side of the user image display region 60. By scrolling the scroll button 62 up and down, the user image 61 which is not displayed in the user image display region 60 appears in the user image display region 60.

Figure 9:
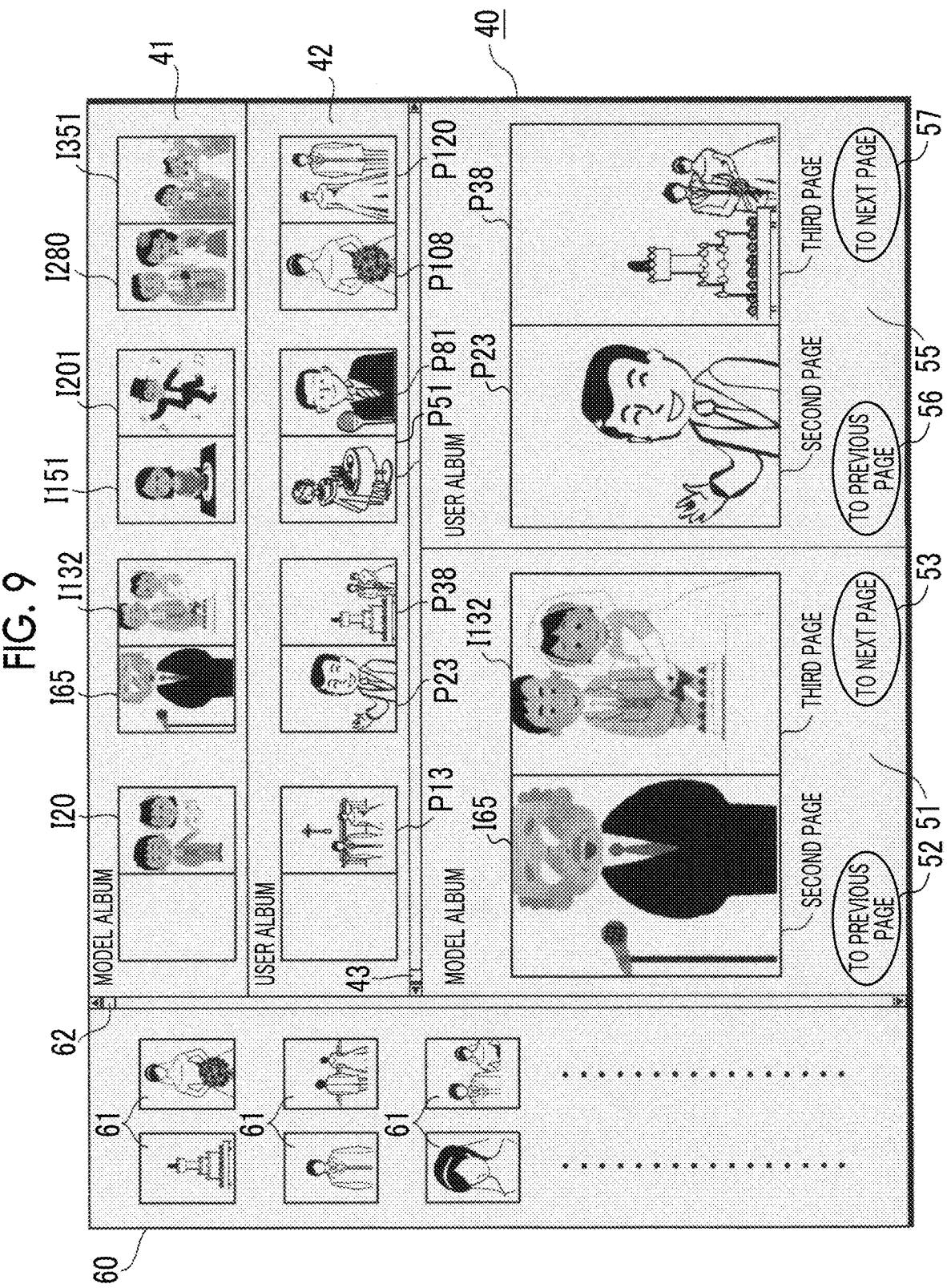
FIG. 9 shows an example of the album display window.

In a case in which the next page buttons 53 and 57 are clicked, the album display window 40 becomes as shown in FIG. 9.

Referring to FIG. 9, in the model album page display region 51, the model image I65 attached on the second page of the model album 20 and the model image I132 attached on the third page of the model album 20 are displayed. At the lower left portion of the model album page display region 51, a previous page button 52 in which the character string "to previous page" is displayed is formed.

In the user album page display region 55, the user image P23 attached on the second page of the user album and the user image P38 attached on the third page of the user album are displayed. The previous page button 56 is also formed at the lower left portion of the user album page display region 55.

Only one of the previous page button 52 or the previous page button 56 may be formed, and in response to any click, the previous pages of the pages displayed in the model album page display region 51 and the user album page display region 55 may be displayed in conjunction in the model album page display region 51 and the user album page display region 55. In this case, the user can also compare and confirm the corresponding pages of the model album 20 and the user album.

Figure 10:
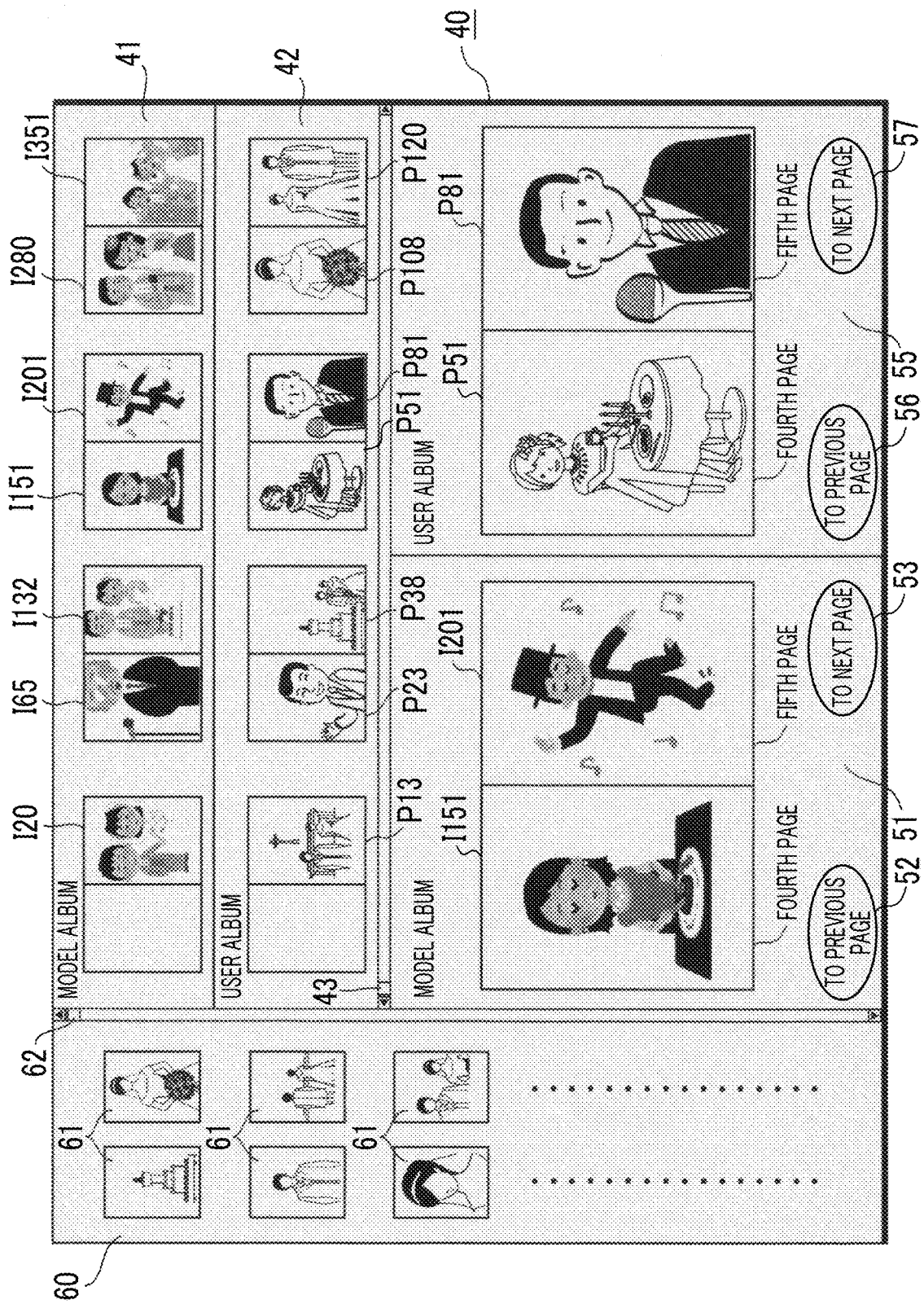
FIG. 10 shows an example of the album display window.

In a case in which the next page buttons 53 and 57 are clicked, the album display window 40 becomes as shown in FIG. 10.

Referring to FIG. 10, in the model album page display region 51, the model images I151 and I201 attached on the fourth and fifth pages of the model album 20 are displayed. In the user album page display region 55, the user images P51 and P81 attached on the fourth and fifth pages of the user album are displayed.

Figure 11:
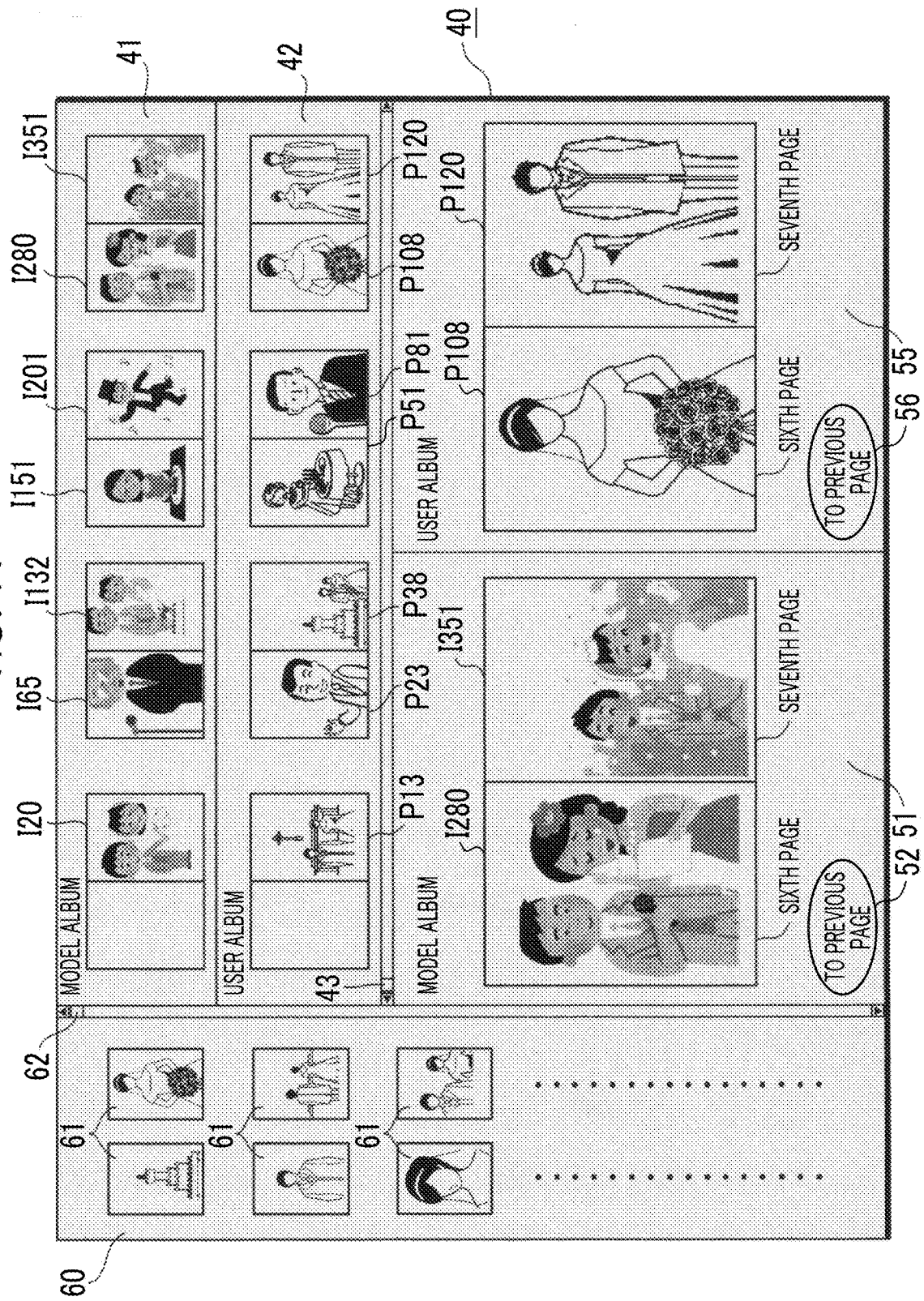
FIG. 11 shows an example of the album display window.

In a case in which the next page buttons 53 and 57 are clicked, the album display window 40 becomes as shown in FIG. 11.

Referring to FIG. 11, in the model album page display region 51, the model images I280 and I351 attached on the sixth and seventh pages of the model album 20 are displayed. In the user album page display region 55, the user images P108 and P120 attached on the sixth and seventh pages of the user album are displayed.

In a case in which the user image attached on the user album is to be changed (YES in step S30 of FIG. 4), the page of the user album in which the user image is to be changed is displayed in the user album page display region 55. A desired user image is selected from among the user images 61 displayed in the user image display region 60, and dragged and dropped onto the user image to be changed. Accordingly, the user image is changed (step S31).

In the first embodiment, the second combination in which the rank difference is within the second threshold value is detected from among the first combinations, the model image group and the user image group are generated based on the second combination, and the user images P13, P23, P38, P51, P81, P108, and P120 similar to the model images I20, I65, I132, I151, I201, I280, and I351 attached on the model album 20 are detected. As a result, it is possible to prevent the user image of a different scene from being detected as the image similar to the model image attached on the model album 20.

Modification Example

In the first embodiment, among the model image and the user image that configure the second combination, the model image to the model image immediately before the model image that configures the next second combination are defined as the model image group, and the user image to the user image immediately before the user image that configures the next second combination are defined as the user image group. As described above, two or more model images and two or more user images which are present between two second combinations having adjacent ranks among the detected second combinations may be decided as the model image group and the user image group, but two or more model images and two or more user images which are present between the second combinations having ranks before and behind one second combination among the detected second combinations may be decided as the model image group and the user image group.

For example, referring to FIG. 6, in a case in which one second combination is the combination of the model image I51 and the user image P21, the second combinations before and behind the combination of the model image I51 and the user image P21 are the combination of the model image I2 and the user image P3 and the combination of the model image I150 and the user image P49. The model images from the model image I25 that is present between the combination of the model image I2 and the user image P3 and one combination of the model image I51 and the user image P21 to the model image I100 that is present between one combination of the model image I51 and the user image P21 and the combination of the model image I150 and the user image P49 are defined as the model image group. Similarly, the user image P11 to the user image P36 are the user image group corresponding to the model image group.

In addition, two or more model images and two or more user images which are present between two second combinations having different ranks among the detected second combinations may be decided as the model image group and the user image group.

For example, referring to FIG. 6, in a case in which among two second combinations, a first second combination is the combination of the model image I2 and the user image P3 and a second second combination is the combination of the model image I150 and the user image P49, the model images from the model image I2 (or I3) to the model image I149 (or I150) which are present between the combination of the model image I2 and the user image P3 and the combination of the model image I150 and the user image P49 are the model image group. Similarly, the user image P3 (or P4) to the user image P48 (or P49) are the user image group corresponding to the model image group. Since two or more model images and two or more user images which are present between two second combinations need only be decided as the model image group and the user image group, the model image group need only be, for example, any two or more images of the model images I2 to I149, and similarly, the user image group need only be, for example, any two or more images of the user images P3 to P48.

The model image group and the user image group can be appropriately decided, and the user album close to the model album can be created.

The image processing device 1 in the embodiment described above may be configured by using a dedicated device, but can also be configured by using a smartphone, a personal computer, a tablet terminal, or the like.

Examples of a processing unit that executes the above processing, in addition to the CPU 2 that executes software and functions as various processing units, include a programmable logic device that is a processor whose circuit configuration can be changed after manufacture, such as a field programmable gate array (FPGA), and a dedicated electric circuit that is a processor having a circuit configuration that is specially designed in order to execute specific processing, such as an application specific integrated circuit (ASIC).

One processing unit may be configured by one of these various processors, or may be configured by two or more processors of the same type or different types (for example, a plurality of FPGAs, or a combination of the CPU and the FPGA). As an example of configuring a plurality of processing units with one processor, first, as represented by a computer such as a client computer or a server, there is a form in which one processor is configured by a combination of one or more CPUs and software, and the processor functions as a plurality of processing units. Second, as represented by a system on chip (SoC), there is a form in which a processor is used that realizes the functions of the entire system including a plurality of processing units with a single integrated circuit (IC) chip. As described above, the various processing units are configured by one or more of the above various processors as a hardware structure.

Furthermore, the hardware structure of these various processors is, more specifically, an electric circuit in which circuit elements such as semiconductor elements are combined.

EXPLANATION OF REFERENCES

1: image processing device
2: CPU
3: display device
4: communication device
5: hard disk
6: hard disk drive
7: memory
8: keyboard
9: mouse
10: compact disk drive
11: compact disk
12: memory card reader and writer
13: memory card
20: model album
40: album display window
41: model album list display region
42: user album list display region
43: scroll button
51: model album page display region
52: previous page button
53: next page button
55: album page display region
56: previous page button
57: next page button
60: user image display region
61: user image
62: scroll button
I1 to I351: model image
P1 to P120: user image

What is claimed is:

1. An image processing device comprising:
   a processor; and
   a display device,
   wherein the processor
      detects, from among a plurality of sample images and a plurality of captured images each of which has a rank, first combinations of the sample images and the captured images of which a similarity is equal to or more than a first threshold value;
      detects, from among the first combinations, second combinations of the sample images and the captured images in which a difference between the rank of a sample image among the plurality of sample images and the rank of a captured image among the plurality of captured images is within a second threshold value;
      decides, based on the second combinations, a combination of a sample image group including the sample images and a captured image group including captured images regarded as a same scene as the sample image group; and
      decides, from the captured image group, the captured image of which the similarity with one sample image included in the sample image group is equal to or more than a third threshold value, and
   wherein the display device displays the captured image of which the similarity with the one sample image included in the sample image group is equal to or more than the third threshold value.

2. The image processing device according to claim 1, wherein the processor:
   divides, based on the second combinations, the plurality of sample images into a plurality of the sample image groups; and
   divides, based on the second combinations, the plurality of captured images into a plurality of the captured image groups.

3. The image processing device according to claim 1, wherein the one sample image is adopted in a sample photo book from among the plurality of sample images.

4. The image processing device according to claim 3, wherein the processor positions the captured image of which the similarity with the one sample image included in the sample image group is equal to or more than the third threshold value at a position at which the one sample image of which the similarity with the captured image is equal to or more than the third threshold value is positioned in a photo book template for generating a photo book corresponding to the sample photo book.

5. The image processing device according to claim 1, wherein the processor detects, from among the plurality of sample images and the plurality of captured images, the first combinations of the sample images and the captured images of which the similarity is equal to or more than the first threshold value, as third combinations of the sample images and captured images of which the similarity is maximum.

6. The image processing device according to claim 1, wherein the processor decides two or more sample images and two or more captured images which are present between two second combinations having different ranks among the second combinations as the sample image group and the captured image group.

7. The image processing device according to claim 1, wherein the processor decides two or more sample images and two or more captured images which are present between two second combinations having adjacent ranks among the second combinations as the sample image group and the captured image group.

8. The image processing device according to claim 1, wherein the processor decides two or more sample images and two or more captured images which are present between the second combinations having ranks before and behind one second combination among the second combinations as the sample image group and the captured image group.

9. The image processing device according to claim 1, wherein the processor decides, from the captured image group, the captured image of which the similarity is maximum with one sample image included in the sample image group.

10. An image processing method comprising:
    detecting, from among a plurality of sample images and a plurality of captured images each of which has a rank, first combinations of the sample images and the captured images of which a similarity is equal to or more than a first threshold value;
    detecting, from among the first combinations, second combinations of the sample images and the captured images in which a difference between the rank of a sample image among the plurality of sample images and the rank of a captured image among the plurality of captured images is within a second threshold value;
    deciding, based on the second combinations, a combination of a sample image group including the sample images and a captured image group including captured images regarded as a same scene as the sample image group;
    deciding, from the captured image group, the captured image of which the similarity with one sample image included in the sample image group is equal to or more than a third threshold value; and
    displaying the captured image of which the similarity with the one sample image included in the sample image group is equal to or more than the third threshold value.

11. A non-transitory recording medium that stores a computer-readable program that controls a computer of an image processing device to:
    detect, from among a plurality of sample images and a plurality of captured images each of which has a rank, first combinations of the sample images and the captured images of which a similarity is equal to or more than a first threshold value more;
    detect, from among the first combinations, second combinations of the sample images and the captured images in which a difference between the rank of a sample image among the plurality of sample images and the rank of a captured image among the plurality of captured images is within a second threshold value;
    decide, based on the second combinations, a combination of a sample image group including the sample images and a captured image group including captured images regarded as a same scene as the sample image group;
    decide, from the captured image group, the captured image of which the similarity with one sample image included in the sample image group is a third threshold value; and
    display the captured image of which the similarity with the one sample image included in the sample image group is equal to or more than the third threshold value.

* * * * *